(12) United States Patent
Grimm

(10) Patent No.: US 6,517,147 B2
(45) Date of Patent: Feb. 11, 2003

(54) VEHICLE ROOF, IN PARTICULAR MOTOR VEHICLE ROOF

(75) Inventor: Rainer Grimm, Frankfurt (DE)

(73) Assignee: ArvinMeritor GmbH, Dietzenbach (DE)

(*) Notice: Subject to any disclaimer, the term of this patent is extended or adjusted under 35 U.S.C. 154(b) by 0 days.

(21) Appl. No.: 10/034,703

(22) Filed: Dec. 28, 2001

(65) Prior Publication Data

US 2002/0093225 A1 Jul. 18, 2002

(30) Foreign Application Priority Data

Jan. 15, 2001 (DE) .......................... 101 01 450

(51) Int. Cl.$^7$ .................................................. B60J 7/00
(52) U.S. Cl. ...................... 296/210; 296/214; 296/39.1; 296/208
(58) Field of Search ............................. 296/210, 214, 296/39.1, 208

(56) References Cited

U.S. PATENT DOCUMENTS 4,741,945 A * 5/1988 Brant et al. ................. 296/214
4,902,068 A * 2/1990 Dowd et al. ................. 296/214
5,688,022 A * 11/1997 Adams et al. ............... 296/214
5,845,458 A * 12/1998 Patel ........................... 296/210
6,086,145 A * 7/2000 Wandyez ..................... 296/214
6,318,797 B1 * 11/2001 Bohm et al. ................. 296/210

FOREIGN PATENT DOCUMENTS

DE 19709016 A1 * 10/1998

* cited by examiner

Primary Examiner—D. Glenn Dayoan
Assistant Examiner—Lori L Coletta
(74) Attorney, Agent, or Firm—Carlson, Gaskey & Olds

(57) ABSTRACT

A sandwich construction vehicle roof module with an inner shell applied to this made of a dimensionally stable foam plastic has, integrated in the inner shell and formed from its foam plastic, grilles for air outlet and/or air passage. The grilles are therefore not components to be produced separately and installed in the inner shell, but unobtrusive elements of the inner shell itself and allow dazzle-free indirect lighting of the vehicle interior and/or the passage of targeted air flows for the ventilation and air extraction system for the vehicle interior.

5 Claims, 1 Drawing Sheet

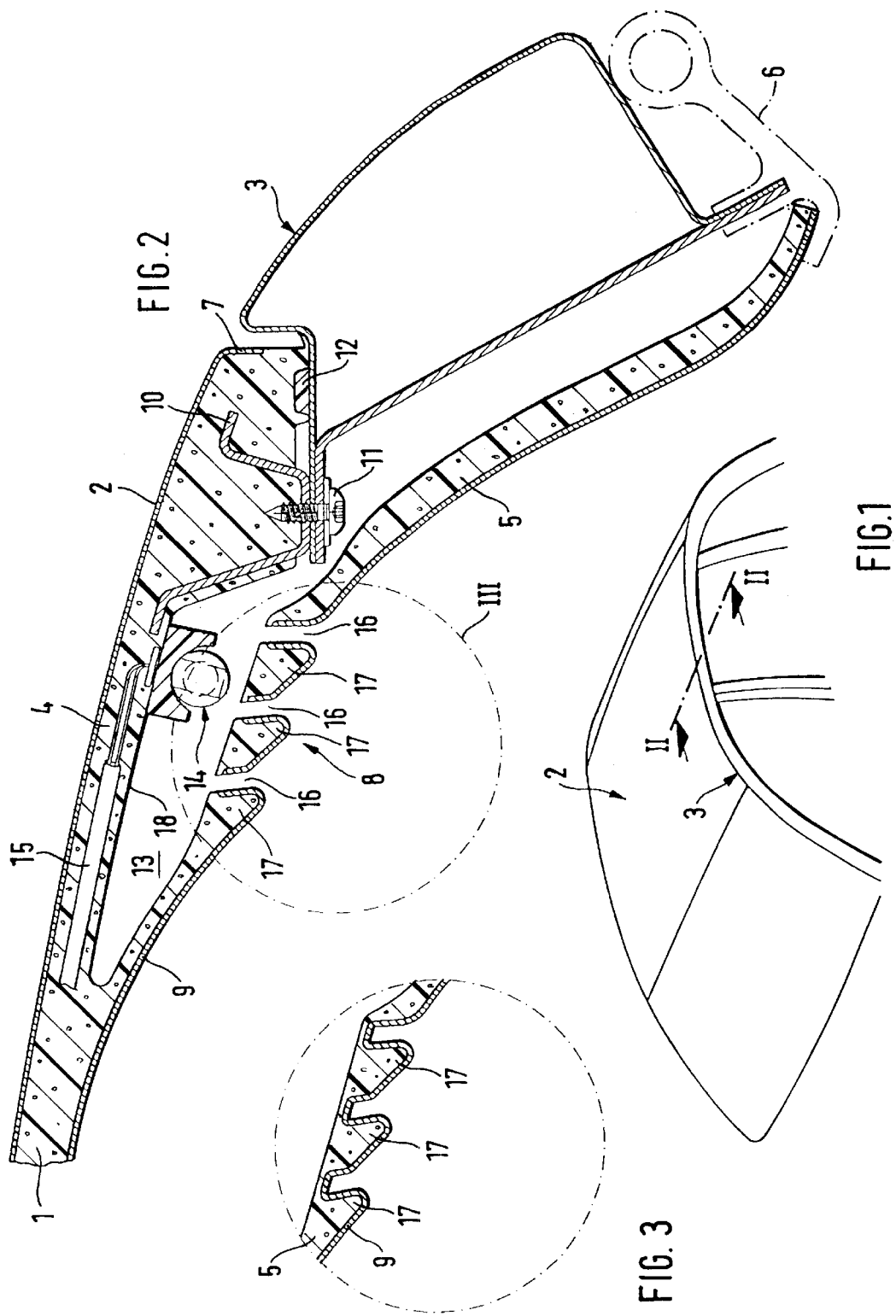

VEHICLE ROOF, IN PARTICULAR MOTOR VEHICLE ROOF

BACKGROUND OF THE INVENTION

The invention relates to a vehicle roof, in particular a motor vehicle roof, that is constructed sandwich-like from an outer shell and an inner shell connected to this formed as a headlining from foam plastic and produced separately from the vehicle body, which can rest with its outer edges on a bodywork frame and be firmly connected to this, wherein cavities are provided on the inner shell, said cavities being connected to the vehicle interior via grilles.

DESCRIPTION OF THE PRIOR ART

Such preproduced modular construction vehicle roofs, ready for installation, are produced separately from the vehicle body and only combined with the vehicle body on the assembly line in the production plant. In particular because of the considerable shortening of assembly times on the assembly line, these vehicle roof modules are enjoying increasing importance. These preproduced vehicle roofs can be fitted with further preassembled vehicle components such as integrated fully functioning sliding roof units, sun screens, handles, ventilation grilles, interior lights, impact-absorbing safety elements, airbags etc.

In a known vehicle roof (DE 197 09 016 A1) in the area of the outer edges of the vehicle roof intended to rest on the body frame, the inner shell is divided into two layers, the top layer of which can be placed on the vehicle frame while the lower layer is formed to bend downwards to cover the vehicle frame. With the exception of a sliding roof unit, all preassembled vehicle components are here fitted to suitable locations on the lower downwardly flexible layer of the inner shell. The cavities in the inner shell are here limited by the lower layer of inner shell. Consequently the grilles are located in the lower layer which can be bent downwards to cover the vehicle frame.

According to a proposal not previously published (DE patent application 199 51 659.6), vehicle components referred to there as function elements are also inserted releasably in the area of the inner shell not divided into two layers, in recesses formed in the foam plastic starting from the headlining surface. The cavities formed by such recesses can be formed as part of an air duct system and be covered by ventilation grilles.

According to another proposal not previously published (DE patent application 199 47 238.6) the vehicle roof consists of a rigid roof skin with a single layer inner shell foamed thereon and a headlining preformed as a separate part of foam plastic. The roof skin with foamed inner shell is here, in a manner of speaking, the outer shell of the type described initially, whereas the headlining preformed separately is consequently the inner shell. The headlining is locked releasably and interchangeably with the roof skin/inner shell. In this vehicle roof module, in the headlining, namely between the headlining and the laminate of roof skin and foamed inner shell, cavities are formed so that the invention described in more detail below is applicable similarly to this structure of roof module.

Where grilles are provided in the headlining surface of these differently structured vehicle roofs and connect cavities with the vehicle interior, these grilles are formed as separate parts and are inserted in the corresponding openings in the headlining surface during the preassembly of the roof module. Here it is difficult to structure the grilles in color and design so that they do not intrude visually in the headlining surface.

The invention is based on the task of simplifying production of the modular preproduced vehicle roofs of the type described initially with regard to design and application of grilles in the headlining surface, and in particular structuring these to be unobtrusive.

BRIEF SUMMARY OF THE INVENTION

According to the present invention, there is provided a vehicle roof, in particular a motor vehicle roof, that has a sandwich-like construction including an outer shell and an inner shell connected to the outer shell formed as a headlining from foam plastic and produced separately from the vehicle body, which can rest with its outer edges on a bodywork frame and be firmly connected to the frame, wherein cavities are provided on the inner shell with grilles and wherein the grilles are formed from the foam plastic material of the inner shell itself and hence are unitary with passage openings arranged at intervals from each other, the passage openings allowing passage between the cavities and the vehicle interior.

The grilles are therefore, on formation of the inner shell of foam plastic, molded easily as one piece with the inner shell so that separate production and fitting of grilles in the vehicle roof is not required. These grilles integrated in the inner shell are relatively unobtrusive and do not disrupt the homogeneous appearance of the headlining surface facing the vehicle interior. The grilles can be provided both at cavities for air supply and/or extraction and for partial covering of interior lights fitted behind the grilles in the cavities closed by the grilles. In the latter case access to the interior lights is preferably provided outside the grilles so that where applicable the bulbs can be changed.

The passage openings can have any suitable geometric cross-section shape, preferably however they are designed as slot-like passage openings and are limited by fin-like ribs formed from the foam plastic material of the inner shell. If a light is fitted in a cavity closed by this grille, an advantageously dazzle-free and indirect interior lighting can be achieved, where the fin-like ribs influence the light emission from the cavity in the required direction. If this grille is used as a ventilation element the fin-like ribs allow air flows targeted according to their preset alignment.

To form passage openings in the foaming of the inner shell, the passage openings are first only preshaped, i.e. without wall break-through, by forming thinner wall areas at the points of the passage openings. The passage openings are then cut out subsequently. In this way the roof coating material is also applied fold-free in the preformed recesses at the points of the passage openings and is partly cut away when cutting away the thin wall areas. In this way the roof coating material extends from the visible surface of the inner shell into the passage openings so that the fin-like ribs limiting the passage openings are also largely covered with the roof coating material. The visible surface of the headlining therefore appears unobtrusive and homogeneous even at the grille points in comparison with subsequently inserted, separately produced grille structures.

BRIEF DESCRIPTION OF THE DRAWINGS

For a better understanding of the invention and to show how the same may be carried into effect, reference will now be made, by way of example, to the accompanying drawings, in which the embodiments are shown partly in diagram form and which concern a vehicle roof module in which the inner shell, in the area of the outer edges intended to rest on the body frame, as stated above, is divided into two layers.

FIG. 1 shows a perspective view of a vehicle roof;

FIG. 2 shows the broken section through the vehicle roof and through the body frame along line II—II of FIG. 1; and FIG. 3 shows the detail shown in the enlargement circle III in FIG. 2, in an intermediate phase of grille production.

DETAILED DESCRIPTION OF THE INVENTION

The inner shell 1 of the roof module is formed from a foam plastic which is foamed onto a rigid roof skin 2. The rigid roof skin 2 consists of a deep drawn metal plate, preferably aluminum plate, or a vacuum molded plastic film. The invention is however also applicable to roof module designs in which there is no solid roof skin. Here the roof module essentially consists of a hard, shell-like, inherently rigid, molded foam plastic with smooth painted outer surface.

The inner shell 1 in the area of the outer edges intended to rest on the vehicle frame 3, of which only one outer edge is shown, is divided into two layers of which the upper layer 4 is laid on the body frame 3 while the lower layer 5 projects over the outer edges of the vehicle roof and can be bent downwards without permanent deformation for passage through the body opening limited by the body frame 3. The lower layer 5 is designed to rest on the body frame 3 and be fastened thereto, for example via function elements (not shown) to be bolted to the body frame. The connection between the lower layer 5 and the body frame 3 can take place via connecting piping 6, shown diagrammatically in dotted lines in FIG. 2, which at the same time can have a cavity cut out to seal the adjacent vehicle door (not shown) to the body frame 3.

Suitable materials for the inner shell 1 are PUR-based hard foam plastics which can be reinforced by fibers, for example glass fiber sections incorporated through the plastic before foaming. But also textiles, fabrics, fleeces etc. inlaid in the foam mold are suitable as reinforcement. By foaming onto the reinforced inner shell 1, the upper layer 4 of which extends to an edge fold 7 of the roof skin 2, a sandwich-like laminate roof module is achieved with high dimensional rigidity and strength. All inner contours of the inner shell 1 including the lower layer 5 and the grille 8 to be described are formed by corresponding shaping of the foam mold (not shown).

To form a headlining, the inner surface of the inner shell 1 can be coated with a textile or film-like cover material 9. At the edge of the upper layer 5, a reinforcement part 10 in the form of a complete profile can be embedded in the foam. In the example shown the reinforcement part 10 is not embedded completely in the thickened edge area of the upper layer 4 but lies with its undersurface exposed so that the reinforcement part 10 lies directly on the body frame 3 and is connected firmly but releasably with this via bolts 11. After releasing the lower layer 5 from the connecting piping 6, the bolts 11 are accessible from below with tools. In the area of the support of the thickened edge area of the upper layer 4, a peripheral molded receiving groove is provided in which is located an adhesive bead 12 for sealing and attaching the roof module to the body frame 3.

As FIG. 2 shows, the inner shell 1 in the area of its division into two layers 4 and 5 is shaped such that a permanent cavity 13 is formed between the two layers. In the example drawn, arranged within this cavity 13 is at least one lamp 14, the base of which is attached to the upper layer 4 for example by foaming. The light 14 is connected via a foamed-in electric lead 15, shown broken away, to the onboard network of the motor vehicle and can be switched on and off by means of a switch (not shown) fitted at a suitable point.

The cavity 13 is at least partially opened to the vehicle interior via the grille 8. The grille 8 formed from the foam plastic material of the inner shell 1 itself and hence as one piece has in the example shown three passage openings 16 at intervals which are formed as slots in their longitudinal extension vertical to the drawing plane. The slots are evidently not designed extending over a greater length as this would reduce the dimensional strength of the lower layer 5 of the inner shell 1. Several grilles 8 with interrupted slot-like passage openings 16 can be arranged in succession. As FIG. 2 shows, the slot-like passage openings 16 are limited on both sides by the fin-like ribs 17 formed from the foam plastic material of the inner shell 1.

As FIG. 3 shows, the slot-like passage openings 16 are first formed only as corresponding recesses molded in the underside of the lower layer 5 of the inner shell 1 suitably during the foam molding. The wall thickness of the lower layer 5 is thus considerably reduced at the lowest points of the recesses without break-through. In the molding process the cover material 9 is also deformed so that the recesses are lined with this. Then the remaining thin recess walls are cut away, for example by punching, to form the openings following the course of the wall surfaces limiting the recesses, resulting in the configuration shown in FIG. 2. Here the cover material 9 extends into the passage openings 16 so that these are integrated unobtrusively into the headlining, matching the color of the roof environment. With regard to their walls limiting the passage openings 16, the ribs 17 are aligned so that firstly the required direction of light emission and/or air flow is achieved and secondly removal from the mold is possible after foam molding of the inner shell 1.

The surface of the upper layer 4 limiting the cavity 13 at the top can, when the grille 8 is used as light opening, be formed with a light reflective coating as a reflection surface 18. As a result the grille 8 allows dazzle-free indirect lighting of the vehicle interior or the required lighting zones of the vehicle interior. The grille 8 can however also, as well as the lighting function described, be exclusively or additionally part of the ventilation and air extraction system of the vehicle interior.

In summary a sandwich construction vehicle roof module is proposed with an inner shell applied to this made of a dimensionally stable foam plastic which has, integrated in the inner shell and formed from its foam plastic, grilles for air outlet and/or air passage. The grilles are therefore not components to be produced separately and installed in the inner shell but unobtrusive elements of the inner shell itself and allow dazzle-free indirect lighting of the vehicle interior and/or the passage of targeted air flows for the ventilation and air extraction system for the vehicle interior.

I claim:

1. A vehicle roof assembly that is produced separately from a vehicle body and which can rest on a vehicle body frame and be firmly connected to the frame, comprising:
    an outer shell;
    an inner foam plastic shell connected to the outer shell, the inner shell including a plurality of cavities and a plurality of grilles associated with the cavities such that passage openings in the grilles allow passage between the cavities and an interior of the vehicle, the grilles being formed from the foam plastic material of the inner shell and unitary with the inner shell.

2. The assembly of claim 1, wherein the passage openings are formed as slot-like openings and are limited by fin-like ribs formed from the foam plastic material of the inner shell.

3. The assembly of claim 1, wherein the passage openings are cut out portions of the inner shell.

4. The assembly of claim 1, including a cover material on the inner shell adapted to face toward the interior of the vehicle, the cover material covering over the inner shell and extending at least partially into the passage openings.

5. The assembly of claim 1, wherein the passage openings are arranged at intervals from each other.

* * * * *